United States Patent
Paradise et al.

(10) Patent No.: US 10,653,966 B1
(45) Date of Patent: May 19, 2020

(54) CONTROLLING PEER-TOURNAMENT CLIENT OPERATION WITH SEGMENTATION OF CLIENTS

(71) Applicant: Skillz Inc., San Francisco, CA (US)

(72) Inventors: Andrew Paradise, San Francisco, CA (US); Miriam Aguirre, Oakland, CA (US)

(73) Assignee: Skill, Inc, San Francisco, CA (US)

( * ) Notice: Subject to any disclaimer, the term of this patent is extended or adjusted under 35 U.S.C. 154(b) by 0 days.

(21) Appl. No.: 16/269,758

(22) Filed: Feb. 7, 2019

(51) Int. Cl.
*A63F 13/80* (2014.01)
*G06F 16/953* (2019.01)
*H04L 29/08* (2006.01)

(52) U.S. Cl.
CPC ............ *A63F 13/80* (2014.09); *G06F 16/953* (2019.01); *H04L 67/1091* (2013.01); *H04L 67/12* (2013.01)

(58) Field of Classification Search
CPC ... A63F 13/80; G06F 16/953; H04L 67/1091; H04L 67/12
See application file for complete search history.

(56) References Cited

U.S. PATENT DOCUMENTS 9,220,983 B1 * 12/2015 Menkhus ................. A63F 13/12
9,384,631 B2 * 7/2016 Arnone ............... G07F 17/3279
2010/0105454 A1 * 4/2010 Weber .................... G06Q 30/02 463/1
2015/0082382 A1 * 3/2015 Maguire ................. H04L 63/08 726/3
2017/0270751 A1 * 9/2017 Paradise ................. A63F 13/34

* cited by examiner

*Primary Examiner* — Dmitry Suhol
*Assistant Examiner* — Ankit B Doshi
(74) *Attorney, Agent, or Firm* — Mintz Levin Cohn Ferris Glovsky and Popeo, P.C.

(57) ABSTRACT

Data specifying a first segment of a set of clients forming part of a peer-tournament system and first configuration parameters can be received. The first configuration parameters can specify operation of a first peer tournament interface. The first peer-tournament interface can be integrated into a third-party gaming application. The first peer-tournament interface can provide a peer-to-peer tournament for the third-party gaming application. The first segment, including a first subset of the set of clients forming part of the peer-tournament system, can be determined. A request for initiation of peer-tournament operation can be received from the first peer-tournament interface. The first segment can be determined to include a first client. The first configuration parameters can be transmitted. The first configuration parameters can cause the first client to modify operation of the first peer-tournament interface in response to receiving the transmitted configuration parameters. Related apparatus, systems, techniques and articles are also described.

20 Claims, 7 Drawing Sheets

CONTROLLING PEER-TOURNAMENT CLIENT OPERATION WITH SEGMENTATION OF CLIENTS

TECHNICAL FIELD

The subject matter described herein relates to controlling operation of a client based on segmentation of a set of clients.

BACKGROUND

In a video game tournament involving a video game and a large number of players, the players can operate identical clients to play the video game, such as a video game console, Steam, and the like, and the games can be played over a network, such as a local area network, or the Internet.

A recent expansion of video game tournaments played over the Internet, or online video game tournaments, has reflected the overall expansion of computer networks from small local networks to the Internet and the growth of Internet access itself. With the growth of the Internet came the expansion of networked devices, or clients, capable of operating video games, such as mobile devices. Consequently, some devices, or clients, may require different configurations.

SUMMARY

In an aspect, data specifying a first segment of a set of clients forming part of a peer-tournament system and first configuration parameters associated with the first segment can be received. The first configuration parameters can specify operation of a first peer tournament interface. The first peer-tournament interface can be integrated into a third-party gaming application. The first peer-tournament interface can provide a peer-to-peer tournament for the third-party gaming application. The first segment, including a first subset of the set of clients forming part of the peer-tournament system, can be determined. A request for initiation of peer-tournament operation can be received from the first peer-tournament interface. The first peer-tournament interface can be integrated into the third-party gaming application. The third-party gaming application can be executing on a first client. The first segment can be determined to include the first client. The first configuration parameters can be transmitted in response to receiving the request for initiation of peer-tournament operation from the first peer-tournament interface. The first configuration parameters can cause the first client to modify operation of the first peer-tournament interface in response to receiving the transmitted configuration parameters.

One or more of the following features can be included in any feasible combination. For example, the first segment can be determined by executing a query of a database. The database can store data characterizing the set of clients forming part of the peer-tournament system. The stored data can specify the first segment of the set of clients. The stored data can include a structured query language expression that can define characteristics of clients within the first segment.

Data characterizing a second segment of the set of clients forming part of a peer-tournament system and second configuration parameters associated with the second segment can be received. The second segment, including a second subset of the set of clients forming part of the peer-tournament system can be determined. The first segment can be determined to include the first client and the second segment can be determined to include the first client. The first segment can include an associated priority that is determined to be greater than an associated priority of the second segment. The first configuration parameters can be transmitted to the first client in response to determining that the first segment includes the associated priority that is greater than the associated priority of the second segment.

Data characterizing a plurality of segments of the set of clients forming part of the peer-tournament system and a plurality of configuration parameters can be received. Each of the plurality of configuration parameters can be associated with at least one of the plurality of segments of the set of clients forming part of the peer-tournament system. The plurality of segments can include the first segment and the plurality of configuration parameters can include the first configuration parameters. The received data characterizing the plurality of segments can be used to determine subsets associated with respective segments of the plurality of segments for each of the plurality of segments. The determined subsets can include subsets of the set of clients forming part of the peer-tournament system. The first client can be determined to be included in at least two of the plurality of segments. The first segment can include an associated priority that is determined to be greater than an associated priority of each other segment of the at least two of the plurality of segments. The first configuration parameters can be transmitted to the first client is in response to the determining that the first segment includes the associated priority that is greater than the associated priority of each other segment of the at least two of the plurality of segments.

A request for peer-tournament operations can be received from a second peer-tournament interface. The second peer-tournament interface can be integrated into a second third party gaming application. The second third-party gaming application can be executing on a second client. The first segment can be determined to include the second client. The first configuration parameters can be transmitted to the second client in response to receiving the request for peer-tournament operation from the second peer-tournament interface. The first configuration parameters can cause the second client to modify operation of the second peer-tournament interface in response to receiving the transmitted first configuration parameters.

The peer-tournament operation for use in executing tournament operation can be determined based on the first configuration parameters associated with the first segment. The determined peer-tournament operation can be transmitted to the first peer-tournament interface.

The first configuration parameters can include chat enabled or disabled, custom matches enabled or disabled, play enabled or disabled, user interface elements to display, tournaments to make available, geographic locations to make available, reconnection tolerance and network latency thresholds.

The peer-tournament system can include a segmentation manager engine, a continuous delivery pipeline, a configuration parameter manager engine, and the set of clients. The segmentation manager engine can be configured to prompt a user for input specifying the first segment of the set of clients. The segmentation engine manager can perform the receiving data specifying the first segment of the set of clients. The segmentation manager engine can be configured to provide the received data specifying the first segment of the set of clients to the continuous delivery pipeline.

The continuous delivery pipeline can be configured to perform the determining of the first segment. The determining of the first segment can include executing a query of a database storing data characterizing the set of clients forming part of the peer-tournament system. The stored data can specify the first segment of the set of clients and can include a structured query language expression that can define characteristics of clients within the first segment. The continuous delivery pipeline can be configured to provide the determined first segment to the configuration parameter manager engine.

The configuration parameter manager engine can be configured to perform the receiving of the request for initiation of peer-tournament operation from the first peer-tournament interface. The configuration parameter manager engine can be configured to perform the determining that the first segment includes the first client. The configuration parameter manager engine can be configured to perform the transmitting of the first configuration parameters to the first client.

The first segment can be determined periodically. The first segment can be determined in a current iteration and a preceding iteration. Clients in the first segment after a preceding iteration of determining the first segment that are determined not to be in the first segment after the current iteration of determining the first segment can be removed. Clients determined to be in the first segment after a current iteration of determining the first segment that were determined not to be in the first segment after a preceding iteration of determining the segment can be added.

The first peer-tournament interface can receive transmitted first configuration parameters. The first peer-tournament interface can modify operation of the first peer-tournament interface in response to receiving in response to receiving the transmitted first configuration parameters.

The first peer-tournament interface can provide the peer-to-peer tournament utilizing the third-party gaming application and according to the first configuration parameters.

In another aspect, a system can include a segmentation server and a tournament server. The segmentation server can be configured to be configured to receive data specifying a first segment of a set of clients forming part of a peer-tournament system and first configuration parameters associated with the first segment. The first peer-tournament interface can be integrated into a third-party gaming application. The first peer-tournament interface can provide a peer-to-peer tournament for the third-party gaming application. The segmentation server can be configured to be configured to determine the first segment, including a first subset of the set of clients forming part of the peer-tournament system.

The tournament server can be configured to receive a request for initiation of peer-tournament operation from the first peer-tournament interface. The first peer-tournament interface can be integrated into the third-party gaming application. The third-party gaming application can be executing on a first client. The first segment can be determined to include the first client. The tournament server can be configured to transmit the first configuration parameters in response to receiving the request for initiation of peer-tournament operation from the first peer-tournament interface. The first configuration parameters can cause the first client to modify operation of the first peer-tournament interface in response to receiving the transmitted configuration parameters.

The segmentation server can be configured to execute a query of a database to determine the first segment. The database can store data characterizing the set of clients forming part of the peer-tournament system. The stored data can specify the first segment of the set of clients. The stored data can include a structured query language expression that can define characteristics of clients within the first segment.

The segmentation server can be configured to receive data characterizing a second segment of the set of clients forming part of a peer-tournament system and second configuration parameters associated with the second segment. The segmentation server can be configured to determine the second segment, including a second subset of the set of clients forming part of the peer-tournament system. The first segment can be determined to include the first client and the second segment can be determined to include the first client. The first segment can include an associated priority that is determined to be greater than an associated priority of the second segment. The segmentation server can be configured to transmit the first configuration parameters to the first client in response to determining that the first segment includes the associated priority that is greater than the associated priority of the second segment.

The segmentation server can be configured to be configured to receive data characterizing a plurality of segments of the set of clients forming part of the peer-tournament system and a plurality of configuration parameters. Each of the plurality of configuration parameters can be associated with at least one of the plurality of segments of the set of clients forming part of the peer-tournament system. The plurality of segments can include the first segment and the plurality of configuration parameters can include the first configuration parameters. The segmentation server can be configured to use the received data characterizing the plurality of segments to determine subsets associated with respective segments of the plurality of segments for each of the plurality of segments. The determined subsets can include subsets of the set of clients forming part of the peer-tournament system. The first client can be determined to be included in at least two of the plurality of segments. The first segment can include an associated priority that is determined to be greater than an associated priority of each other segment of the at least two of the plurality of segments. The segmentation server can be configured to transmit the first configuration parameters to the first client is in response to the determining that the first segment includes the associated priority that is greater than the associated priority of each other segment of the at least two of the plurality of segments.

The tournament server can be configured to receive a request for peer-tournament operations from a second peer-tournament interface. The second peer-tournament interface can be integrated into a second third party gaming application. The second third-party gaming application can be executing on a second client. The tournament server can be configured to determine the first segment to include the second client. The tournament server can be configured to transmit the first configuration parameters to the second client in response to receiving the request for peer-tournament operation from the second peer-tournament interface. The first configuration parameters can cause the second client to modify operation of the second peer-tournament interface in response to receiving the transmitted first configuration parameters.

The tournament server can be configured to determine peer-tournament operation for use in executing tournament operation based on the first configuration parameters associated with the first segment. The tournament server can be configured to transmit the determined peer-tournament operation to the first peer-tournament interface.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
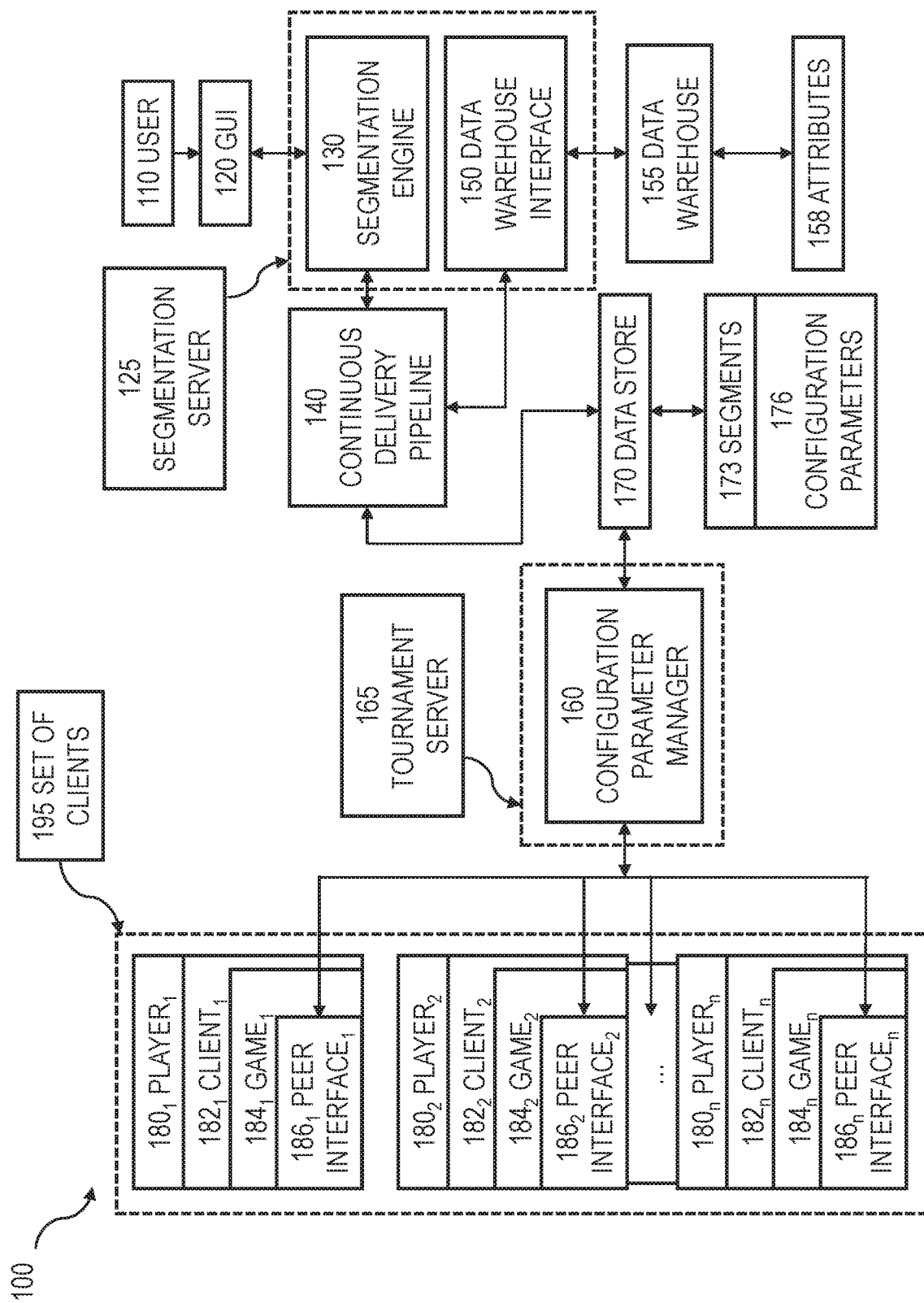
FIG. 1 is a system block diagram illustrating an example system that facilitates segmenting a set of clients forming part of a peer-tournament system.

A video game tournament can include a competition involving a large number of players playing a video game. Some video game tournaments can involve a multiplayer video game hosted by a single entity, such as the game developer, and can be played over a network, such as a local area network, or the internet. Some tournaments can utilize a peer-to-peer video game tournament platform that can enable eSports tournaments across a wide range of games including games that may not have built in tournament functionality, for example, single player mobile games. In such a peer-to-peer tournament platform, in order to provide the tournament functionality, a peer-to-peer server can work with (e.g., communicate with, work in tandem with, and the like) many different clients executing local game instances. These different clients can include different operating systems (e.g., ANDROID®, IOS®, versions thereof, and the like), hardware components, network connection quality, security restrictions, software versions, and the like, such that in order for the clients to compete in the same tournament, they may need to be configured differently. Similarly, the peer tournament server may need to be configured to operate differently for different clients. For example, some clients may be configured to include different network latency threshold requirements, which, if are not met by their respective networks, would result in disabling tournament functionality.

But these client and/or server configuration parameters (also referred to as system settings) may need to be dynamic and may be updated regularly. Because the peer tournament platform can simultaneously enable many different tournaments for many different clients, it may not be feasible for a systems manager to individually update the settings for each client. Accordingly, some aspects of the subject matter described herein can facilitate segmentation of clients within a peer-to-peer video game tournament system, and modification and/or dynamic updating of client and server configuration parameters (e.g., system settings), which can enable dynamic and flexible control of client and tournament operation. The current subject matter can reduce the load on a peer-to-peer video game tournament system's technical infrastructure, reduce the network latency experienced by players, and provide a better overall peer-to-peer video game tournament system.

In some implementations, the current subject matter can group the set of all clients of the tournament platform into segments. For example, users can define a segment of clients based on a client and/or player attribute, such as geographic location, video games played, number of tournaments entered, and the like, and users can link a segment to one or more configuration parameters. This can allow users to specify configuration parameters (which can control operation of the associated clients) by specifying segments, rather than having to specifically control or change the configuration parameters of each individual client. Such an approach can enable a user to determine a segment of players for a particular tournament, and can allow players in a segment to compete in tournaments specific to their respective segment. In some implementations, the current subject matter can include automatic recalculation of segments at predefined time intervals, and can determine a player's segment without querying an entire data warehouse.

FIG. 1 is a system block diagram 100 illustrating an example system that facilitates segmenting a set of clients forming part of a peer-tournament system. The example system can facilitate modification and/or dynamic updating of client and server configuration parameters (e.g., system settings), which can enable dynamic and flexible control of client and tournament operation.

Segmentation system 100 can include a segmentation server 125, a continuous delivery pipeline 140, and a tournament server 165. Segmentation server 125 can include a segmentation manager engine, or segmentation engine, 130, and a data warehouse interface 150, and can enable the grouping of clients $182_i$ of a set of clients 195 into segments. Tournament server 165 can include configuration parameter manager engine, or configuration parameter manager, 160, and can enable dynamic and flexible control of a set of clients 195 (e.g., during runtime). Attributes 158 can be collected from the set of clients 195 and stored in a data warehouse 155. The segmentation engine 130 can receive segment rules (e.g., definitions) from a user 110 through a graphical user interface (GUI) 120. The segment definition can specify attributes 158 to be associated with the segment. The segmentation engine 130 can provide the segment definition to the continuous delivery pipeline 140. The continuous delivery pipeline 140 can schedule the data warehouse interface 150 to execute a query on a data warehouse 155 based on the provided segment definition. The results of the query can be provided to the data store 170 as a segment 173. The segmentation engine 130 can receive configuration parameters 176, associate the configuration parameters 176 to the segment 173, and store them in a data store 170. The configuration parameter manager 160 can receive a request for configuration parameters 176, and can transmit the requested configuration parameters 176.

The set of clients 195 can be formed by clients $182_i$, (where i=1, 2, . . . , n), and the clients $182_i$ can be operated by players $180_i$. Clients $182_i$ can include a mobile device, laptop, video game console, and/or any networked device capable of operating a video game. Each client $182_i$ can include an instance of a third-party gaming application $184_i$, such as ANGRY BIRDS® or CANDY CRUSH®. An instance of a third-party gaming application $184_i$ can include any third-party gaming application in which a peer-tournament interface $186_i$ can be integrated therein. Player skill can determine the outcome of a game, and multiple players $180_i$ can compete against one another in a peer-to-peer tournament. Each instance of a third-party gaming application $184_i$ can be in communication with and receiving game data from a third-party game server. A third-party game server can provide game data necessary to operate the game. In some implementations, instances of third-party gaming applications $184_i$ can exchange game data directly.

Each instance of a third-party gaming application $184_i$ can include a peer-tournament interface $186_i$. A peer-tournament interface $186_i$ can integrate into a third-party gaming application, and can provide necessary functionality, including user interface components, to enable a player $180_i$ to compete in a peer-to-peer tournament. Peer-tournament interface $186_i$ can communicate with a tournament server 165 including a configuration parameter manager 160 to initiate peer-tournament operation of a peer-tournament interface $186_i$ (e.g., tournaments available for a player $180_i$ to play). Peer-tournament interface $186_i$ can communicate with a data warehouse interface 150 to store attributes 158 associated with a player $180_i$ in a data warehouse 155. Attributes 158 can include data specifying the properties of clients $182_i$. Attributes 158 associated with a client $182_i$ can include duration on the peer-tournament system, network latency, strength of network connection, geographic location, account creation date, last game played, and the like.

A data warehouse 155 (e.g., AMAZON REDSHIFT®) can include a central repository of data collected from one or more data sources. The data warehouse 155 can contain data specifying clients $182_i$ and their associated attributes 158. A data source can include the set of clients $182_i$. A data warehouse interface 150 can communicate data (e.g., attributes) from data sources (e.g., clients) to a data warehouse 155. Data warehouse interface 150 can receive a request to execute queries on data warehouse 155, (e.g., from continuous delivery pipeline 140), execute queries on data warehouse 155, receive results of queries (e.g., from data warehouse 155) and transmit query results (e.g., to continuous delivery pipeline 140).

Operation of a peer-tournament interface $186_i$ and associated client $182_i$ can be specified by configuration parameters 176 (e.g., system settings). Configuration parameters 176 can include data specifying the dynamic and/or flexible control of a client $182_i$ and/or peer-tournament interface $186_i$. For example, configuration parameters 176 can include chat enabled or disabled, custom matches enabled or disabled, play enabled or disabled, user interface elements to display, tournaments to make available, geographic locations to make available, network latency thresholds, and the like.

In some implementations, configuration parameters 176 can include offline mode enabled or disabled, game modes to provide (e.g., co-op game mode and/or the like), pending matches to display, completed and/or cancelled matches to display, how games are scored, live event (e.g., tournament and/or the like) cutoff times when no new players can register for the event, warnings related to pending live event cutoff times and the like. Configuration parameters 176 can include email verification requirements for playing and/or the like, data collection frequency, the data to collect, max client idle time before aborting, abort warnings, and the like. Configuration parameters 176 can include a time interval between new chat messages, the frequency of messages fetched each chat update, the amount of time between message fetch attempts, the maximum number of characters in a message, the amount of time before a message is too old to be loaded in a chat room, the maximum number of messages a player can send in a time frame, the time in which a player can send the maximum number of messages before being rate limited, and the like.

In some implementations, configuration parameters 176 can include the base time until a client can reconnect to chat server, the reconnection interval, the maximum time between reconnection attempts, the reconnection tolerance, the amount of time reconnecting before timing out, and the like. Configuration parameters 176 can include the number of times play again button appears, whether the start button instantly starts a match, the text appearing on the start button, the length of the welcome back animation, welcome back enabled or disabled, number of client vibrations, API request analytics enabled or disabled, max number of characters in a contact request and the like. Configuration parameters 176 can include number of vibrations upon finding an opponent, push notifications when game is backgrounded, and the like. Configuration parameters 176 can include displaying modals, GUI elements associated with some and/or any of the operations discussed herein, and the like. Configuration parameters 176 can be associated with a segment 173 (e.g., as a key-value pair, hash map, and/or the like), and can control tournament server 165 and/or client operation of a client $182_i$. A segment 173 can include a set of clients $182_i$ characterized by a shared set of attributes 158, and clients $182_i$ can be segmented by any combination of attributes 158. A segment 173 and associated configuration parameters 176 can be stored in a data store 170. An example process of segmenting clients $182_i$ into segments is discussed below.

A user 110, such as a tournament system manager, can define a segment 173 in a GUI 120. GUI 120 can communicate with a segmentation engine 130, and a segment 173 can be defined by specifying a unique name for the segment 173, and a raw SQL statement specifying attributes 158 associated with the segment 173. The user 110 can specify configuration parameters 176 associated with the segment 173. For example, a user 110 can name a segment Boston Players, and supply a raw SQL statement specifying an attribute user_location on a table named Players, wherein the Players table is stored in a data warehouse (SELECT user_id, game_id FROM Players WHERE user_location='Boston';). A tournament can specify a configuration parameter, and only clients with the specified configuration parameter can access the tournament. The specified configuration parameter segment can be associated with the segment Boston Players, and the tournament will be displayed in a peer-tournament interface $186_i$ for a client $182_i$ in the specified segment 173.

Segmentation engine 130 can prompt a user 110 to input a segment definition (e.g., a raw SQL statement, and/or the like) into GUI 120 specifying (e.g., defining) the segment of the clients. Segmentation engine 130 can receive data (e.g., a raw SQL statement, and/or the like) specifying a segment and can communicate the received data to the continuous delivery pipeline 140. Segmentation engine 130 can receive data specifying configuration parameters that can be associated with the segment, and communicate the configuration parameters to data store 170.

The continuous delivery pipeline 140 can receive the segment definition and determine the segment. To determine the segment, the continuous delivery pipeline 140 can communicate with the data warehouse interface 150, and can periodically transmit a request to the data warehouse interface 150 to execute a query defined by the segmentation engine 130 (e.g., a raw SQL statement specifying segment 173) on data warehouse 155. For example, continuous delivery pipeline 140 can transmit a request to data warehouse interface 150 every hour, day, and/or the like, to execute a query defined by a raw SQL statement specifying a segment 173 on a data warehouse 155. A segment 173 can include a result of a query (e.g., the segment 173 can include clients $182_i$ with user_id's in a set of records returned by the query).

A segment 173, along with configuration parameters 176 that can be associated with the segment, as can be determined above by the continuous delivery pipeline 140, can be stored (e.g., persisted) in a data store 170. The configuration parameter manager 160 can receive a request to initiate peer-tournament operations, for example, from a peer-tournament interface $186_i$ integrated into a third-party gaming application $184_i$ executing on a client $182_i$. The configuration parameter manager 160 can determine that the segment 173 includes a player $180_i$ operating the client $182_i$ (e.g., by querying a data store 170 for a segment 173 a player $180_i$, operating a client $182_i$, is a member of). The configuration parameter manager 160 can transmit configuration parameters 176 associated with the segment 173 the player $180_i$ is a member of (e.g., a highest priority segment the player $180_i$ is a member of) to the peer-tournament interface $186_i$, thereby modifying operation of the peer-tournament interface $186_i$ integrated into the third-party gaming application $184_i$ executing on the client $182_i$.

Data store 170 (e.g., ELASTICSEARCH®) can include a repository for persistently (e.g., permanently, long term, and/or the like) storing and/or managing collections of data. Segment 173, along with configuration parameters 176 associated with the segment, can be stored in data store 170 (e.g., ELASTICSEARCH®) that can enable, for example, a client's $182_i$ segment 173, along with configuration parameters 176 associated with the segment 173, to be determined without an expensive, with respect to time-complexity, querying operation, (e.g., a sequential scan of the data store 170, and/or the like).

Figure 2:
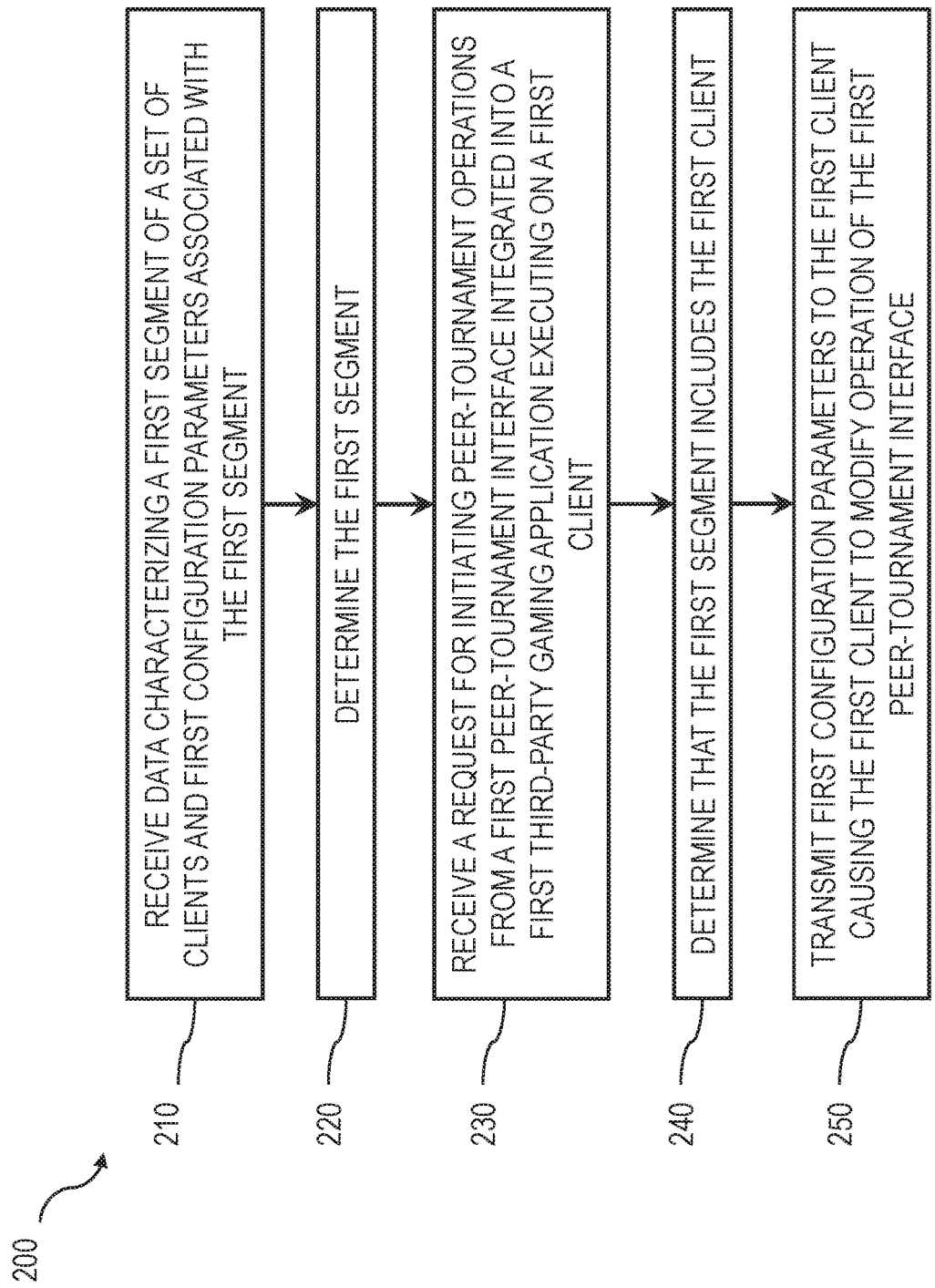
FIG. 2 is a process flow diagram illustrating an example process of controlling tournament server and/or client operation utilizing segmentation.

FIG. 2 is a process flow diagram 200 illustrating an example implementation of a process of controlling operation of a tournament server and/or client utilizing segmentation of a set of clients (e.g., players) within a peer-tournament system. The example process can facilitate segmentation of clients within a peer-tournament system, and modification and/or dynamic updating of client and server configuration parameters (e.g., system settings), which can enable dynamic and flexible control of client and tournament operation.

At 210, data can be received characterizing a first segment of clients forming part of a peer-tournament system and first configuration parameters associated with the first segment. The data can be received by segmentation engine 130. The received data can include a characterization of the first segment of clients. The characterization of the first segment of clients can include a precise request for information retrieval from an information system. The precise request for information retrieval can include a structured query language (SQL) statement representing a SQL query, or any query into an information system. The SQL statement can include attributes characterizing the first segment of clients (e.g., location, latency, and the like). The information system can include a relational database, a non-relational database, a key-value database, a data warehouse, or any system for the collection, organization, storage, and communication of information.

The first segment of clients can include one or more clients $182_i$ forming part of a peer-tournament system. The first configuration parameters associated with the first segment can specify operation of a first peer-tournament interface that can be integrated into a third-party gaming application. The first peer-tournament interface can be integrated into the third-party gaming application operating on a client, and can provide a peer-to-peer tournament for the third-party gaming application. Operation of the first peer-tournament interface can include, for example, configuring a client to include different network latency threshold requirements (such as requiring a network latency below a certain latency value), which, if not met by their respective networks, could result in disabling tournament functionality.

At 220, the first segment can be determined using the data received at 210, and the first segment can include a subset of a set of clients forming part of the peer-tournament system. Determining the first segment can include executing a precise request for information retrieval from an information system using the data received at 210. Executing the precise request for information retrieval from an information system can include executing a SQL statement representing a SQL query on an information system (e.g., Amazon Redshift®), such as the data warehouse 155. The subset of the set of clients forming part of the peer-tournament system can include clients in a set of records returned by the SQL query executed on the information system. For example, if an executed query returns a set of records {client$_1$, client$_2$, client$_3$}, then a first segment determined using received data (e.g., a SQL statement representing the executed query) is the set of records returned from executing the query (e.g., the first segment is {client1, client2, client3}).

At 230, a request to initiate peer-tournament operations can be received by a configuration parameter manager (e.g., configuration parameter manager 160). A first player operating a first client can launch a first third-party gaming application executing on the first client to participate in a peer video game tournament, and the first client can be part of a set of clients forming a peer-tournament system. The configuration parameter manager can receive the request to initiate peer-tournament operations facilitating participation in a peer video game tournament. The request to initiate peer-tournament operations can include a request for configuration parameters that can control operation of the first peer-tournament interface (e.g., disabling the display of certain tournaments in a peer-tournament interface if a client has a network latency above a network latency threshold determined by a configuration parameter).

At 240, the first segment can be determined to include the first client. A configuration parameter manager can perform a request for a set of segments of which the first client is a member, and receive the set of segments of which the first client is a member. For example, the configuration parameter manager can query a data store 170 containing user_id's associated with each segment of a set of clients forming part of a peer-tournament system for segments associated with a user_id of the first client, and receive a set of segments associated with the first client (e.g., a set of segments {segment$_1$, segment$_2$, segment$_3$} to which the first client belongs, and the first segment is segment$_3$). The first segment can be included in the set of segments of which the first client is a member, and therefore, the first segment can be determined to include the first client.

At 250, the first configuration parameters can be transmitted to the first client in response to receiving the request for initiating peer-tournament operations at 230. The first configuration parameters can cause the first client to modify operation of the first peer-tournament interface. For example, operation of the first peer-tournament interface can include disabling peer-tournament functionality, such as peer-to-peer communication (e.g., an ability to chat with other players), in response to the first configuration parameters transmitted to the first client.

Figure 3:
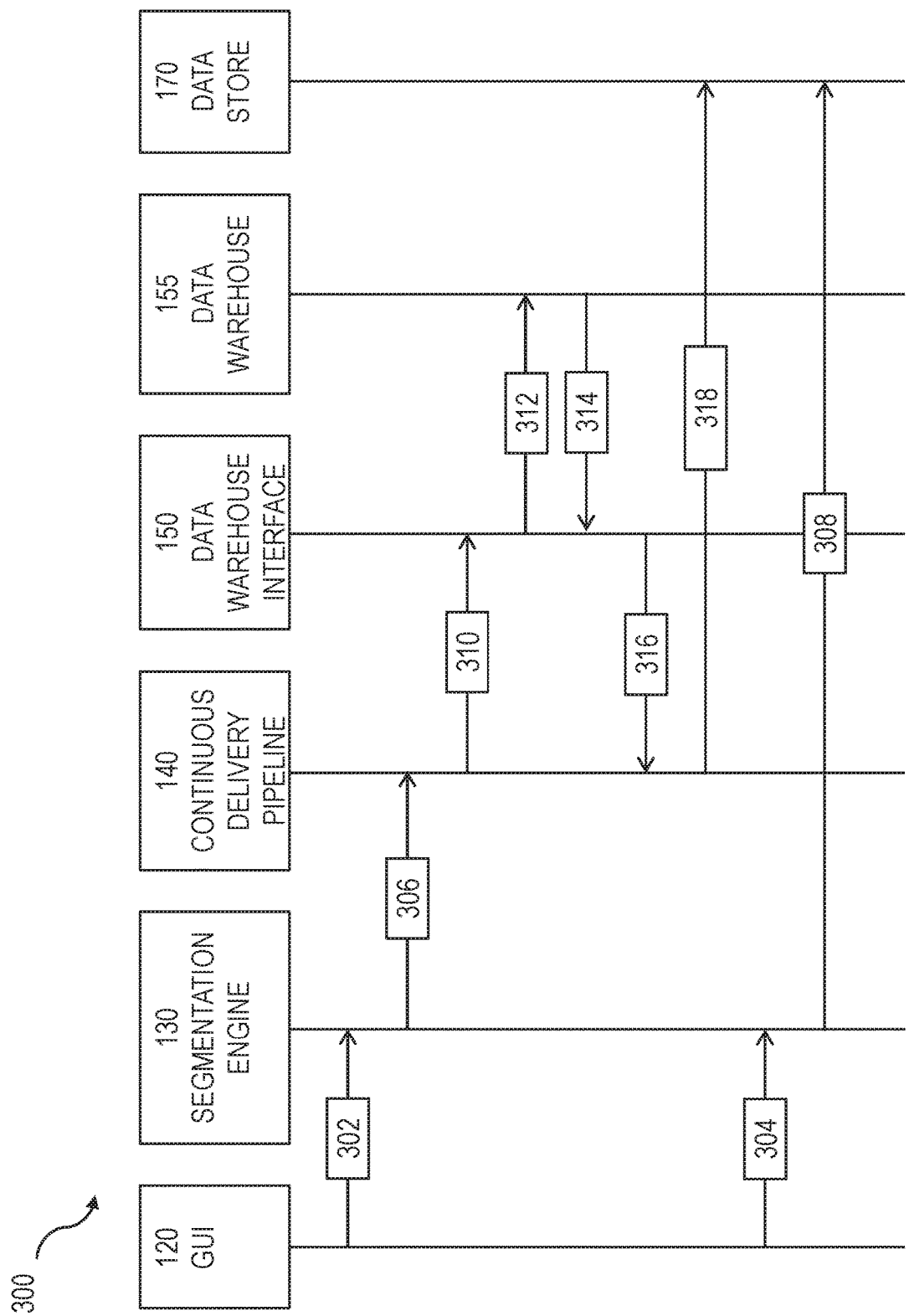
FIG. 3 is a data flow diagram illustrating an example data communication flow when segmenting a set of clients forming part of a peer-tournament system.

FIG. 3 is a data flow diagram 300 illustrating data communication flows between an example implementation of the elements of FIG. 1 for segmenting a set of clients forming part of a peer-tournament system, for example, as illustrated in FIG. 2 at 210 and 220.

At 302, a user 110 defines a segment, and at 304 defines configuration parameters, in the GUI 120, that are associated with the segment defined at 302 and passed to the segmentation engine 130. For example, the configuration parameters can specify operation of a first peer-tournament interface integrated into a third-party gaming application executing on a first client that is a member of a segment. The segment can be defined as a raw SQL statement including a unique identifier for the segment, as well as a priority for the segment.

At 306, the raw SQL statement defining the segment is associated with an automated job in a continuous delivery pipeline 140 that initiates execution of a SQL query of the raw SQL statement at predetermined intervals. At 308, the configuration parameters associated with the defined segment can be persisted into the data store 170. At 310 the continuous delivery pipeline 140 initiates the automated job, and at 312, the data warehouse interface 150 executes the SQL query against the data warehouse 155. At 314, results of the SQL query executed at 312 can be returned to the data warehouse interface 150. At 316, results of the SQL query executed at 312 can be returned to the continuous delivery pipeline 140. At 318, records in the result set of the SQL query executed at 312 can be persisted into the data store 170 as the records associated with the segment, and the segment 173 can be determined to include a subset of a set of clients forming part of a peer-tournament system.

In some implementation, a data store 170 table containing a segment can be updated instead of dropping the data store 170 table and repopulating the table with results of a segmentation method (e.g., querying a data warehouse 160 with a user 110 defined SQL statement representing the segment). A continuous delivery pipeline 140 can initiate execution of a SQL query of the raw SQL statement at predetermined intervals to determine a segment (e.g., a current iteration of execution of a SQL query to determine a segment, and a preceding iteration of execution of the SQL query to determine the segment). At a current iteration of determining a segment 173, a data store 170 table can already contain a record for the segment 173 as determined in a preceding iteration of determining the segment 173. Clients 182$_i$ in a segment 173 during the preceding iteration of determining the segment 173 that are not in the segment 173 during the current iteration of determining the segment 173 can be removed from the segment 173 (e.g., by removing the user_id's of those clients from a record associated with the segment). Clients 182$_i$ not in the segment 173 during the preceding iteration of determining the segment, that are determined to be in the segment in the current iteration of determining the segment can be added to the segment 173 (e.g., by adding the user_id's of those clients to a record associated with the segment). This can reduce overall load on a peer-to-peer video game tournament system's technical infrastructure.

Figure 4:
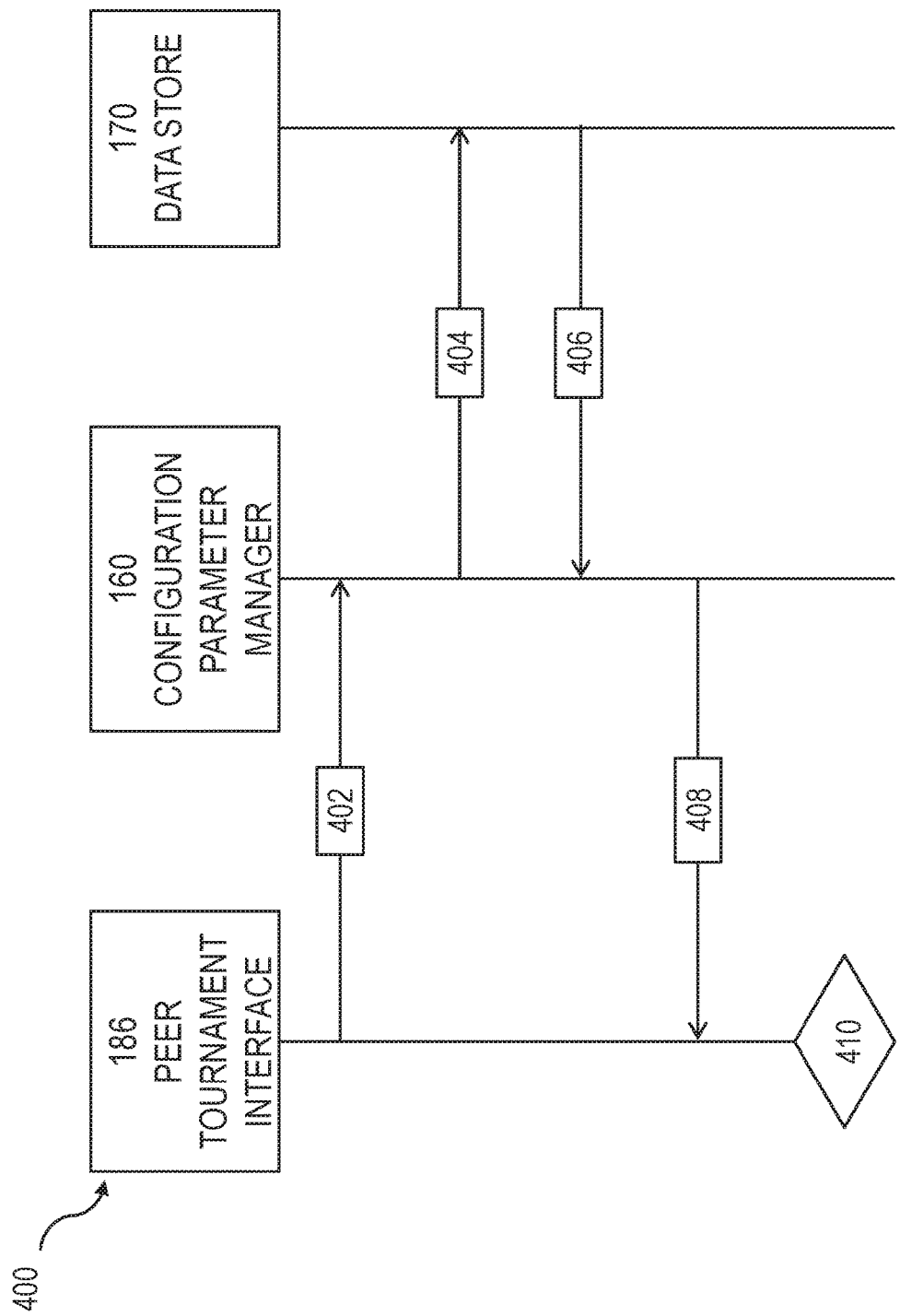
FIG. 4 is a data flow diagram illustrating an example data communication flow when determining configuration parameters for a peer-tournament interface.

FIG. 4 is a data flow diagram 400 illustrating data communication flow between an example implementation of the elements of FIG. 1 when determining configuration parameters for a peer-tournament interface integrated into a third-party gaming application operating on a client of a set of clients forming part of a peer-tournament system, for example, as illustrated in FIG. 2 at 230-250.

At 402, the configuration parameter manager 160 receives a request for configuration parameters, for example, from the peer-tournament interface 186$_i$. The request can be received when the client 182$_i$ initiates operation of the third-party gaming application 184$_i$ (e.g., by launching the game). At 404, the configuration parameter manager 160 can execute a query of the data store 170 to determine the segment associated with the client 182$_i$. The client 182$_i$ can belong to one and/or more segments. As a result, a highest priority segment from the segments associated with the client 182$_i$ can be determined, since configuration parameters associated with a single segment are required for operation of the peer-tournament interface 186$_i$.

At 406, the configuration parameter manager 160 receives configuration parameters 176, (e.g., configuration parameters associated with the highest priority segment associated with the first player 180$_1$). At 408, the configuration parameters 176 (e.g., configuration parameters associated with the highest priority segment associated with the first player 180$_1$) are transmitted by the configuration parameter manager 160 to, for example, the first peer-tournament interface 186$_1$.

At 410, in response to receiving the transmitted configuration parameters, operation of the peer-tournament interface is modified 410. For example, after receiving transmitted first configuration parameters associated with a highest priority segment associated with a first player 180$_1$, a first peer-tournament interface integrated into a first third-party gaming application 184$_1$ executing on a first client 182$_1$ operated by the first player 180$_1$, the first client can modify operation of the first peer-tournament interface 186$_1$ in accordance with the received configuration parameters associated with the highest priority segment associated with the first player 180$_1$.

For example, a player 180$_i$ can launch an instance of a third party gaming application 184$_i$. A peer-tournament interface 186$_i$ can be integrated into the instance of the third party gaming application 184$_i$, and at 402 can send a request for configuration parameters 176. The request for configuration parameters 176 can include a request for the segments 173 the player 180$_i$ is a member of, and can be received by a configuration parameter manager 160. At 404, the configuration parameter manager 160 can execute a query of a data store 170 for the segments 173 the player 180$_i$ is a member of. The data store 170 can include configuration parameters 176 associated with segments 173. At 406, the segments 173, including a highest priority segment, and associated configuration parameters 176 can be returned to the configuration parameter manager 160. At 408, the configuration parameter manager 160 can transmit the configuration parameters 176 associated with the highest priority segment the player $180_i$ is a member of to the peer-tournament interface $186_i$. At 410, the peer-tournament interface $186_i$ can modify operation of the peer-tournament interface $186_i$, for example, removing tournaments where the player $180_i$ can experience a network latency higher than a threshold network latency, therefore reducing the network latency the player $180_i$ experiences, and consequently, reducing the network latency experienced by players.

Figure 5:
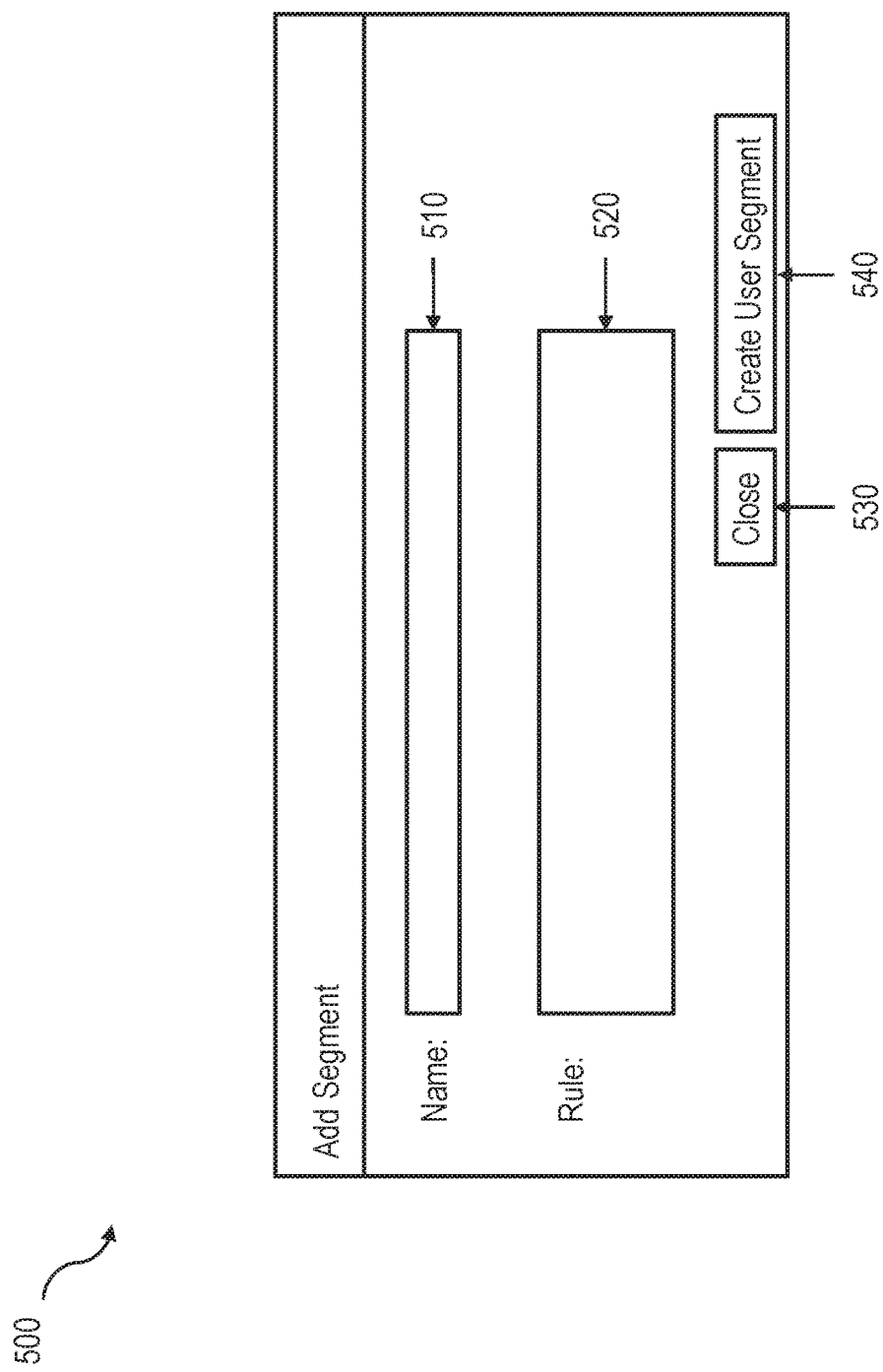
FIG. 5 illustrates an example user interface that can allow users to create a segment.

FIG. 5 is an example user interface 500 that can allow users to create a segment. At 510 the user 110 can enter the name of a segment. At 520 the user can enter the rule for determining the clients in the segment (e.g., a SQL statement that, when executed as a query, will return a set of clients that form the members of the segment). To create the segment, the user 110 can press the Create User Segment button 540, and to abort defining a new segment, the user 110 can press the Close button 530.

Figure 6:
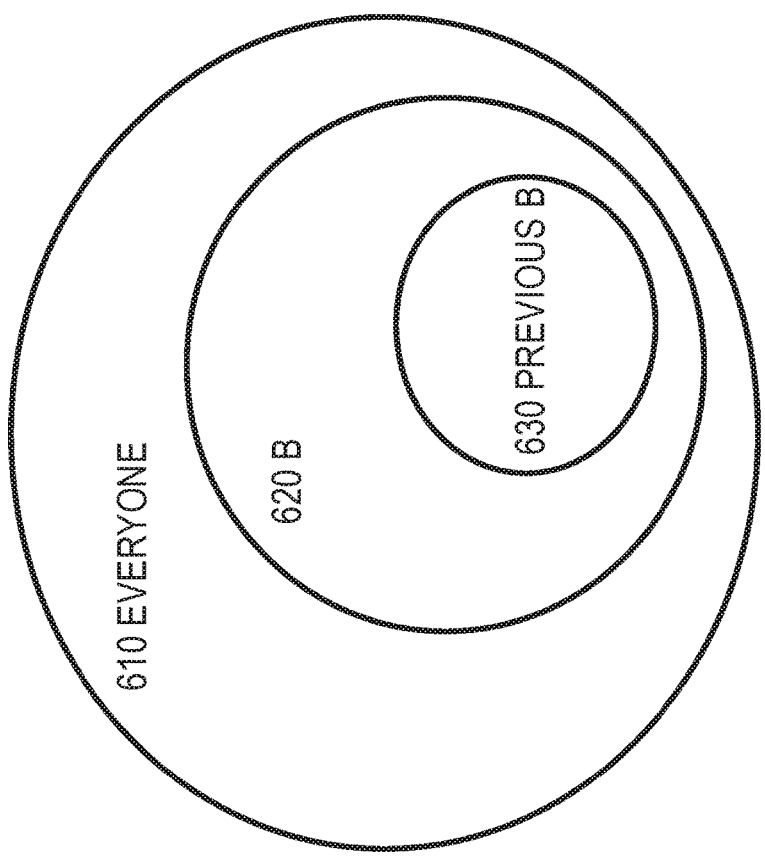
FIG. 6 is an example of segmentation of clients.

Clients can be partitioned into overlapping and/or mutually exclusive segments. FIG. 6 is an example set of clients partitioned into different subsets, which can be overlapping and/or mutually exclusive. Everyone 610 can be a segment that can contains every client of the peer-tournament system. B 620 can be a segment containing a subset of everyone 610, and previous B 630 can be a segment containing a subset of B 620.

Figure 7:
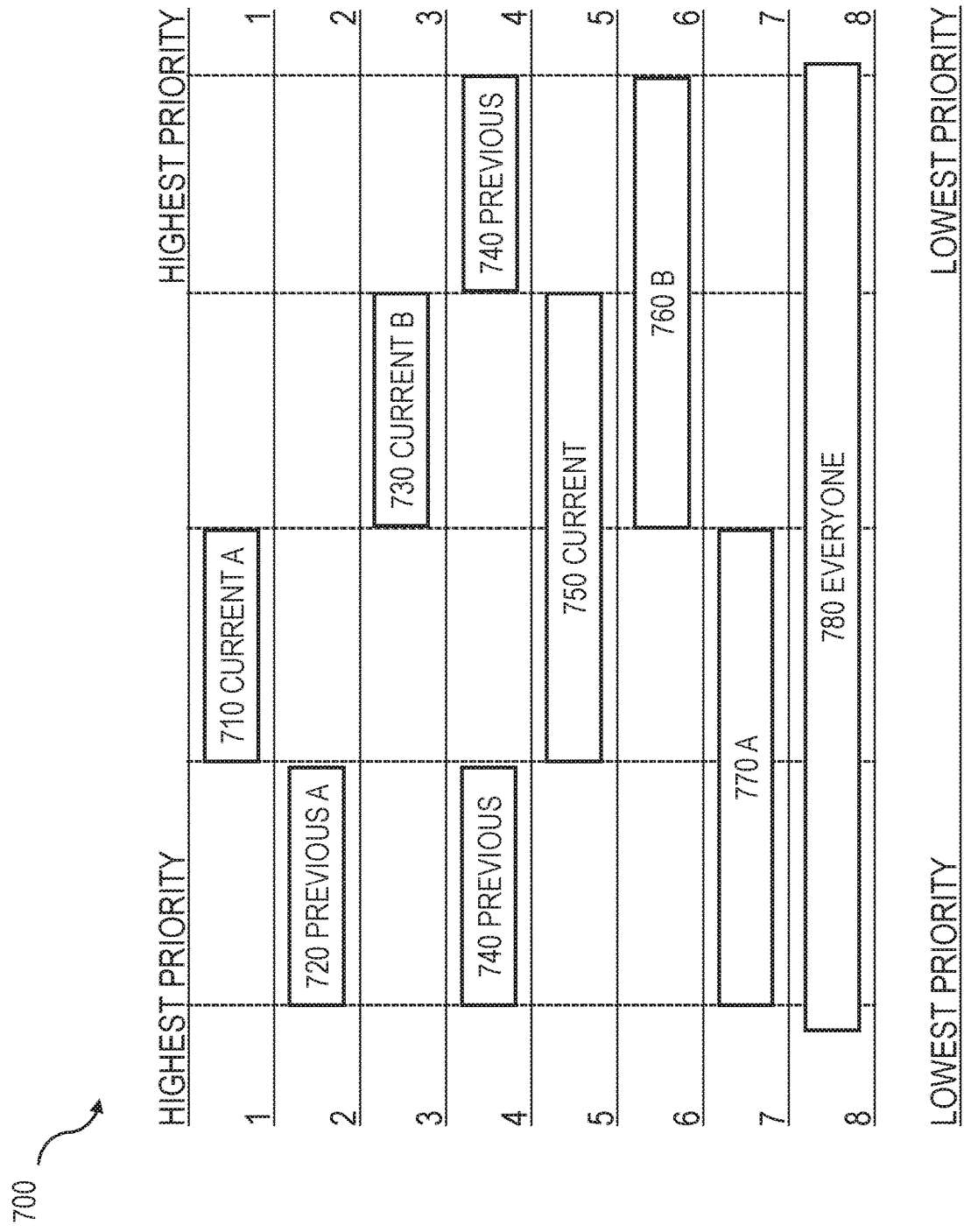
FIG. 7 is a diagram of an example ranking of segments based on priority.

FIG. 7 is a diagram of an example ranking of segments based on priority. Some segments, such as current B 730 and previous A 720 can be mutually exclusive (e.g., no client that is a member of current B 730 is also a member of previous A 720). Some segments, such as current 750 and B 760 can overlap (e.g., some clients can be in both current 750 and B 760, but there are also clients that can be in current 750 but not B 760, like current A 710). Everyone 780 can be a segment that contains every client of the peer-tournament system (e.g., a segment defined with the SQL statement SELECT *). Current A 710, previous A 720, current B 730, previous 740, current 750, B 760, and A 770 can be segments with priorities as shown in FIG. 7. When a client requests configuration parameters, the set of segments the client is a member of can be determined. However, the client can be a member of multiple segments. As such, a highest priority segment for the client can be determined, and the configuration parameters associated with the highest priority segment can be transmitted to the client. For example, if a client is a member of current A 710, current 750, A 770, and everyone 780, current A 710 can be determined to be the highest priority segment, and the configuration parameters associated with current A 710 can be transmitted to the client.

Although a few variations have been described in detail above, other modifications or additions are possible. For example, the current subject matter can create partitions (e.g., segments) of the set of clients $182_i$ using SQL queries on attributes 158, like propensity to play, duration on the system, and/or random variables. For example, the random variables can be used to partition clients for A/B testing. Partitions can include millions of clients $182_i$, and can be defined in a GUI. The data used to create the partitions can be taken from a database and/or a data warehouse (e.g., AMAZON REDSHIFT®). Configuration parameters (e.g., system settings), such as geographic locations to make available, can be attributed to clients in a partition. For clients in the partition, tournaments with clients from those geographic locations can be displayed in the peer-tournament interface. Clients can be in multiple segments, and each segment can have a numeric priority. Clients can inherit the settings of the segment with the highest priority. Default configuration parameters can be associated with segments that don't have associated configuration parameters. Clients can be reclassified into segments (e.g., via a job on JENKINS®) at a controllable interval (e.g., hourly).

The current subject matter can allow users to configure partitions/segments of users, and those partitions can be attached to configuration parameters (e.g., system settings), for example, to run A/B tests to evaluate new features (e.g., tournaments), optimize configuration parameters (e.g., what is the furthest client, with respect to geographical distance, that can compete against a given client), and/or the like. It can be desirable to control operation of clients and to maintain a ranked priority of which elements get exposed to which client. Without customizing a gaming platform for each individual client, clients can receive configuration parameters that are irrelevant to the clients. Client peer-tournament interface can display features, options, and/or the like, that can be associated with configuration parameters.

The current subject matter can allow a user to create a segment based on any combination of attributes stored in the data warehouse, and the user can attach any configuration parameters to the created segment. In some implementation, clients can be intentionally excluded from peer-tournament functionality. For example, clients can be determined to be bad actors, and can be excluded from chatting with other clients, and/or the like.

The current subject matter can segment a large number of clients every time a segmentation job runs (e.g., via JENKINS®, and/or the like). The speed of this process can allow the system to stay up to date with client behavior. Using SQL queries can allow a wide variety of users to interface with the current subject matter in a highly customized way. In some implementations, REDSHIFT®, MYSQL®, and JENKINS® can be used.

The subject matter described herein provides many technical advantages. For example, modification and/or dynamic updating of client and server configuration parameters (e.g., system settings), which can enable dynamic and flexible control of client and tournament operation. The current subject matter can reduce the load on a peer-to-peer video game tournament system's technical infrastructure, and reduce the network latency experienced by players.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving first data specifying a first segment of a set of clients forming part of a peer-tournament system and first configuration parameters associated with the first segment, the first configuration parameters specifying operation of a first peer-tournament interface integrated into a gaming application, the first peer-tournament interface providing a peer-to-peer tournament for the gaming application;
   determining, using the received first data, the first segment including a first subset of the set of clients forming part of the peer-tournament system;
   receiving a request for initiation of peer-tournament operation from the first peer-tournament interface integrated into the gaming application executing on a first client;
   determining that the first segment includes the first client; and
   transmitting, in response to receiving the request, the first configuration parameters to the first client, which cause the first client to modify operation of the first peer-tournament interface in response to receiving the transmitted first configuration parameters.

2. The method of claim 1, wherein determining the first segment includes executing a query of a database storing data characterizing the set of clients forming part of the peer-tournament system, the stored data specifying the first segment of the set of clients and including a structured query language expression defining characteristics of clients within the first segment.

3. The method of claim 1, further comprising:
   receiving second data characterizing a second segment of the set of clients forming part of the peer-tournament system and second configuration parameters associated with the second segment;
   determining, using the received second data, the second segment including a second subset of the set of clients forming part of the peer-tournament system;
   determining that the first segment includes the first client and that the second segment includes the first client; and
   determining that the first segment includes an associated priority that is greater than an associated priority of the second segment, wherein the transmission of the first configuration parameters to the first client is in response to the determining that the first segment includes the associated priority that is greater than the associated priority of the second segment.

4. The method of claim 1, further comprising:
receiving data characterizing a plurality of segments of the set of clients forming part of the peer-tournament system and a plurality of configuration parameters, each of the plurality of configuration parameters associated with at least one of the plurality of segments of the set of clients forming part of the peer-tournament system, the plurality of segments including the first segment and the plurality of configuration parameters including the first configuration parameters;
determining, using the received data characterizing the plurality of segments and for each of the plurality of segments, subsets associated with respective ones of the plurality of segments, the determined subsets including subsets of the set of clients forming part of the peer-tournament system;
determining that the first client is included in at least two of the plurality of segments; and
determining that the first segment includes an associated priority that is greater than an associated priority of each other segment of the at least two of the plurality of segments, wherein the transmission of the first configuration parameters to the first client is in response to the determining that the first segment includes the associated priority that is greater than the associated priority of each other segment of the at least two of the plurality of segments.

5. The method of claim 1, further comprising:
receiving a request for peer-tournament operation from a second peer-tournament interface integrated into a second third party gaming application executing on a second client;
determining that the first segment includes the second client; and
transmitting, in response to receiving the request for peer-tournament operation from the second peer-tournament interface, the first configuration parameters to the second client, which cause the second client to modify operation of the second peer-tournament interface in response to receiving the transmitted first configuration parameters.

6. The method of claim 1, further comprising:
determining, based on the first configuration parameters associated with the first segment, peer-tournament operation for use in executing tournament operation; and
transmitting the determined peer-tournament operation to the first peer-tournament interface.

7. The method of claim 1, wherein the first configuration parameters includes chat enabled or disabled, custom matches enabled or disabled, play enabled or disabled, user interface elements to display, tournaments to make available, geographic locations to make available, reconnection tolerance and network latency thresholds.

8. The method of claim 1, wherein the peer-tournament system includes a segmentation manager engine, a continuous delivery pipeline, a configuration parameter manager engine, and the set of clients; and
wherein the segmentation manager engine is configured to prompt a user for input specifying the first segment of the set of clients and to perform the receiving of the first data specifying the first segment of the set of clients, the segmentation manager engine configured to provide the received first data specifying the first segment of the set of clients to the continuous delivery pipeline;
wherein the continuous delivery pipeline is configured to perform the determining of the first segment, the determining of the first segment including executing a query of a database storing data characterizing the set of clients forming part of the peer-tournament system, the stored data specifying the first segment of the set of clients and including a structured query language expression defining characteristics of clients within the first segment, the continuous delivery pipeline configured to provide the determined first segment to the configuration parameter manager engine;
wherein the configuration parameter manager engine is configured to perform the receiving of the request for initiation of peer-tournament operation from the first peer-tournament interface, perform the determining that the first segment includes the first client; and perform the transmitting of the first configuration parameters to the first client.

9. The method of claim 8 further comprising:
determining the first segment is determined periodically; and
determining the first segment after a current iteration of determining the first segment including:
removing clients in the first segment after a preceding iteration of determining the first segment that are not determined to be in the first segment after the current iteration of determining the first segment; and
adding clients determined to be in the first segment after the current iteration of determining the first segment that were not in the first segment after the preceding iteration of determining the first segment.

10. The method of claim 1, further comprising:
modifying, by the first peer-tournament interface, operation of the first peer-tournament interface in response to receiving the transmitted first configuration parameters.

11. The method of claim 1, further comprising:
providing, by the first peer-tournament interface, the peer-to-peer tournament utilizing the gaming application and according to the first configuration parameters.

12. A system comprising:
a segmentation server configured to perform operations comprising:
receiving first data specifying a first segment of a set of clients forming part of a peer-tournament system and first configuration parameters associated with the first segment, the first configuration parameters specifying operation of a first peer-tournament interface integrated into a gaming application, the first peer-tournament interface providing a peer-to-peer tournament for the gaming application; and
determining, using the received first data, the first segment including a subset of the set of clients forming part of the peer-tournament system; and
a tournament server configured to perform operations comprising:
receiving a request for initiation of peer-tournament operation from the first peer-tournament interface integrated into the gaming application executing on a first client;
determining that the first segment includes the first client; and
transmitting, in response to receiving the request, the first configuration parameters to the first client, which cause the first client to modify operation of the first peer-tournament interface in response to receiving the transmitted first configuration parameters.

13. The system of claim 12, wherein determining the first segment includes executing a query of a database storing data characterizing the set of clients forming part of the peer-tournament system, the stored data specifying the first segment of the set of clients and including a structured query language expression defining characteristics of clients within the first segment.

14. The system of claim 12 wherein the segmentation server is configured to perform operations further comprising:
receiving second data characterizing a second segment of the set of clients forming part of the peer-tournament system and second configuration parameters associated with the second segment;
determining, using the received second data, the second segment including a second subset of the set of clients forming part of the peer-tournament system;
determining that the first segment includes the first client and that the second segment includes the first client; and
determining that the first segment includes an associated priority that is greater than an associated priority of the second segment, wherein the transmission of the first configuration parameters to the first client is in response to the determining that the first segment includes the associated priority that is greater than the associated priority of the second segment.

15. The system of claim 12 wherein the segmentation server is configured to perform operations further comprising:
receiving data characterizing a plurality of segments of the set of clients forming part of the peer-tournament system and a plurality of configuration parameters, each of the plurality of configuration parameters associated with at least one of the plurality of segments of the set of clients forming part of the peer-tournament system, the plurality of segments including the first segment and the plurality of configuration parameters including the first configuration parameters;
determining, using the received data characterizing the plurality of segments and for each of the plurality of segments, subsets associated with respective ones of the plurality of segments, the determined subsets including subsets of the set of clients forming part of the peer-tournament system;
determining that the first client is included in at least two of the plurality of segments; and
determining that the first segment includes an associated priority that is greater than an associated priority of each other segment of the at least two of the plurality of segments, wherein the transmission of the first configuration parameters to the first client is in response to the determining that the first segment includes the associated priority that is greater than the associated priority of each other segment of the at least two of the plurality of segments.

16. The system of claim 12 wherein the tournament server is configured to perform operations further comprising:
receiving a request for peer-tournament operation from a second peer-tournament interface integrated into a second third party gaming application executing on a second client;
determining that the first segment includes the second client; and
transmitting, in response to receiving the request for peer-tournament operation from the second peer-tournament interface, the first configuration parameters to the second client, which cause the second client to modify operation of the second peer-tournament interface in response to receiving the transmitted first configuration parameters.

17. The system of claim 12 wherein the tournament server is configured to perform operations further comprising:
determining, based on the first configuration parameters associated with the first segment, peer-tournament operation for use in executing tournament operation; and
transmitting the determined peer-tournament operation to the first peer-tournament interface.

18. The system of claim 12 wherein the first configuration parameters includes chat enabled or disabled, custom matches enabled or disabled, play enabled or disabled, user interface elements to display, tournaments to make available, geographic locations to make available, reconnection tolerance and network latency thresholds.

19. The system of claim 12 wherein the peer-tournament system includes a segmentation manager engine, a continuous delivery pipeline, a configuration parameter manager engine, and the set of clients; and
wherein the segmentation manager engine is configured to prompt a user for input specifying the first segment of the set of clients and to perform the receiving of the first data specifying the first segment of the set of clients, the segmentation manager engine configured to provide the received first data specifying the first segment of the set of clients to the continuous delivery pipeline;
wherein the continuous delivery pipeline is configured to perform the determining of the first segment, the determining of the first segment including executing a query of a database storing data characterizing the set of clients forming part of the peer-tournament system, the stored data specifying the first segment of the set of clients and including a structured query language expression defining characteristics of clients within the first segment, the continuous delivery pipeline configured to provide the determined first segment to the configuration parameter manager engine;
wherein the configuration parameter manager engine is configured to perform the receiving of the request for initiation of peer-tournament operation from the first peer-tournament interface, perform the determining that the first segment includes the first client; and perform the transmitting of the first configuration parameters to the first client.

20. A computer program product comprising a non-transitory machine readable medium storing instructions that, when executed by at least one programmable processor, cause the at least one programmable processor to perform operations comprising:
receiving data specifying a first segment of a set of clients forming part of a peer-tournament system and first configuration parameters associated with the first segment, the first configuration parameters specifying operation of a first peer-tournament interface integrated into a gaming application, the first peer-tournament interface providing a peer-to-peer tournament for the gaming application;
determining, using the received data, the first segment including a subset of the set of clients forming part of the peer-tournament system;
receiving a request for initiation of peer-tournament operation from the first peer-tournament interface integrated into the gaming application executing on a first client;

determining that the first segment includes the first client; and transmitting, in response to receiving the request, the first configuration parameters to the first client, which cause the first client to modify operation of the first peer-tournament interface in response to receiving the transmitted first configuration parameters.

* * * * *